Patented Dec. 7, 1943

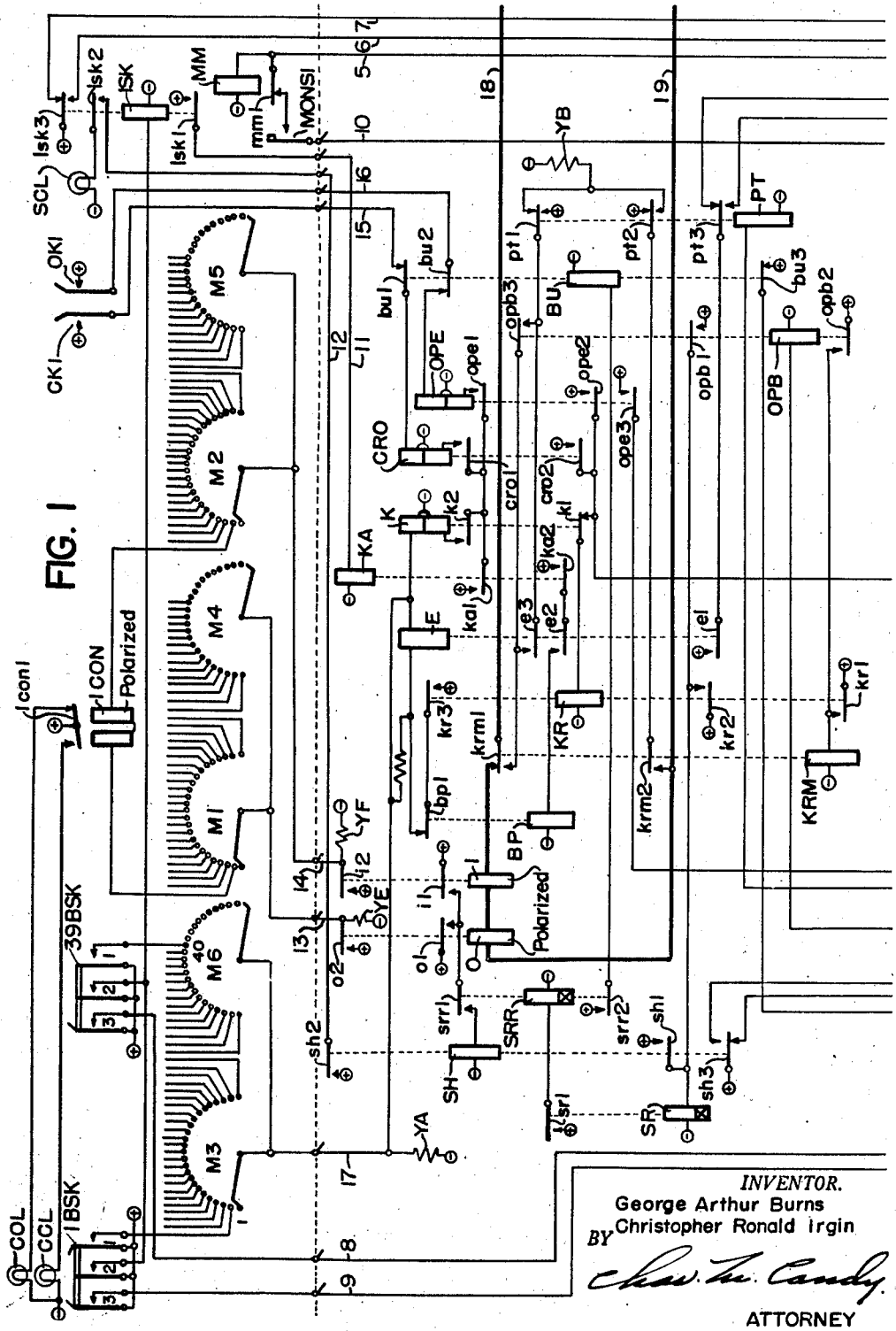

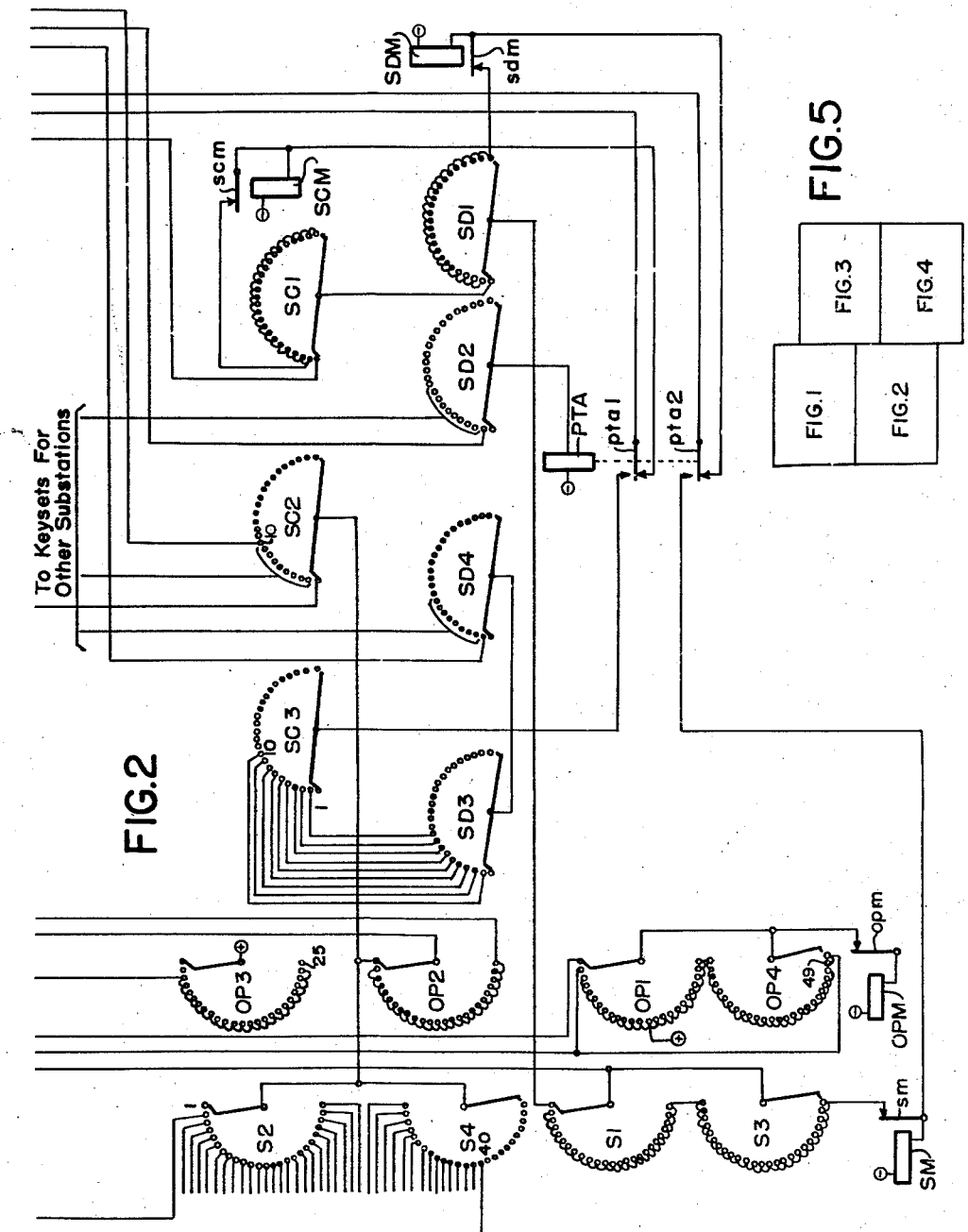

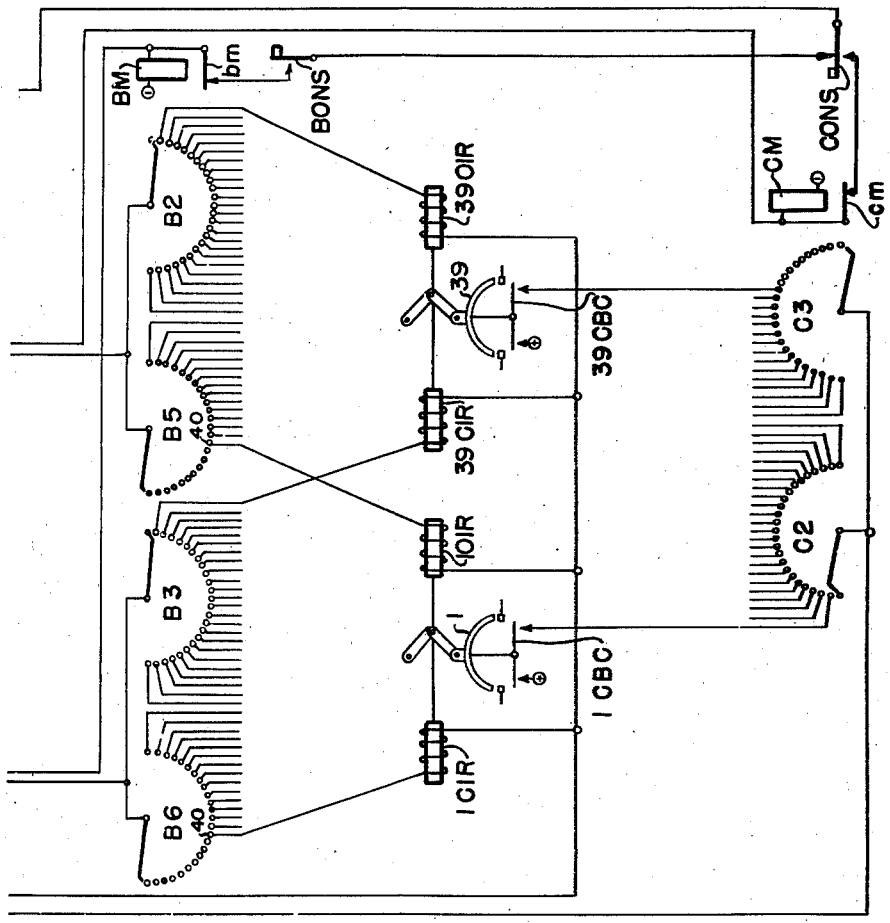
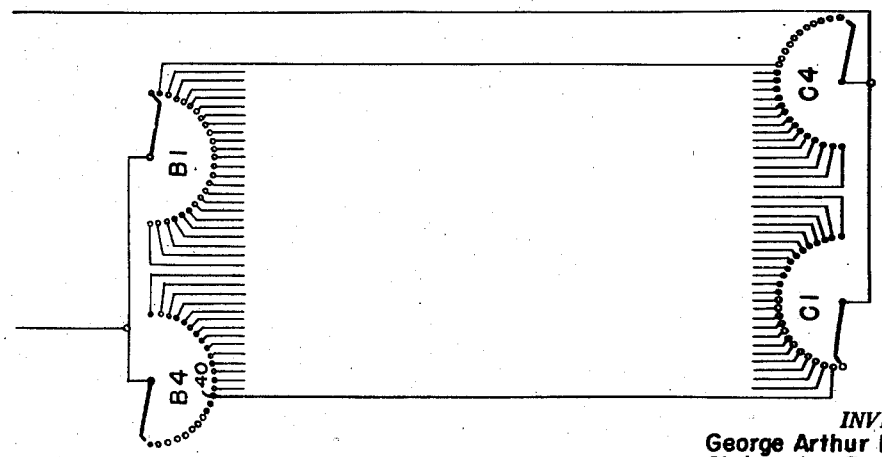
FIG. 4

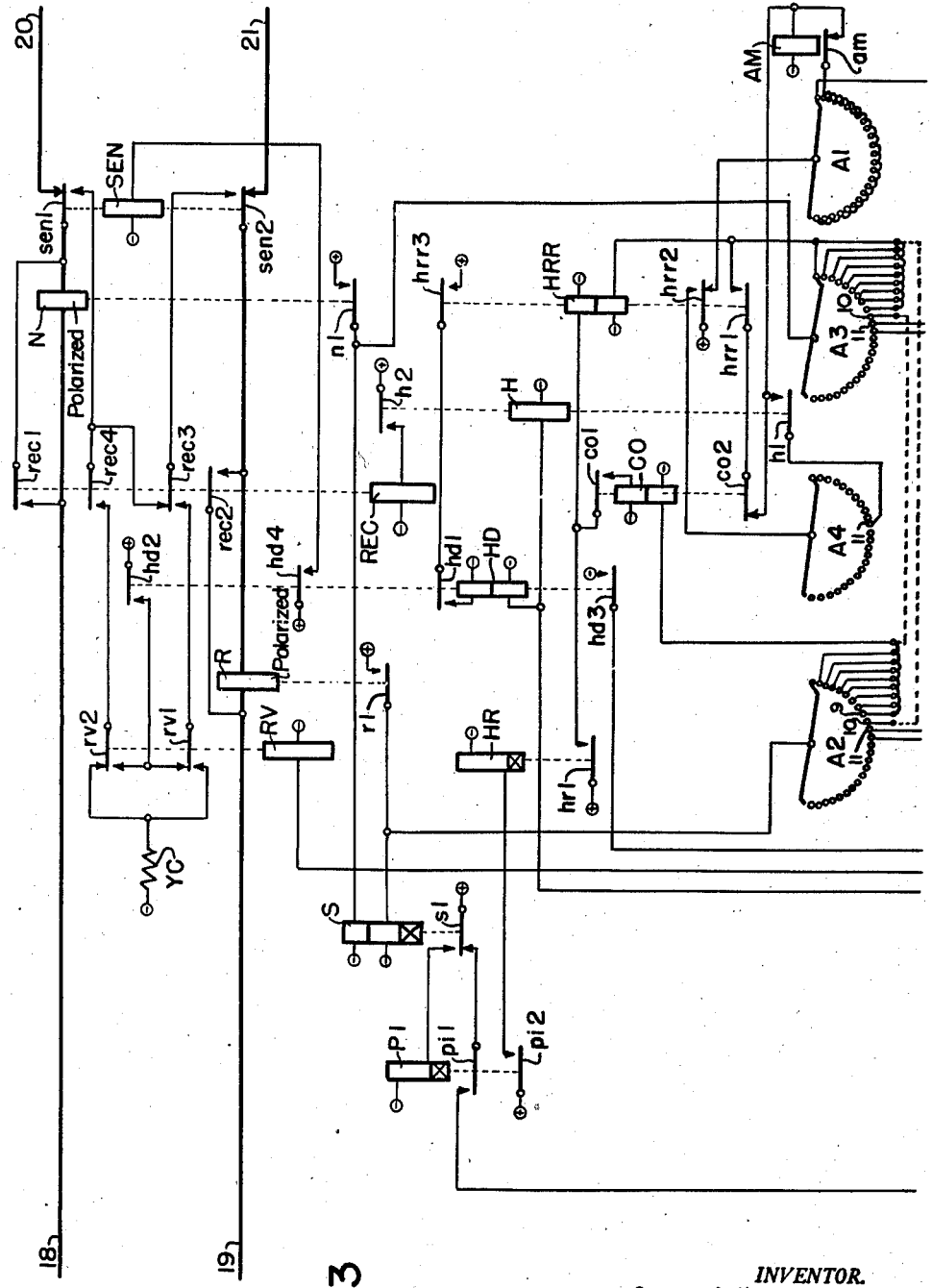

2,336,064

UNITED STATES PATENT OFFICE 2,336,064

REMOTE CONTROL AND SUPERVISORY SYSTEM

George Arthur Burns and Christopher Ronald Irgin, Liverpool, England, assignors, by mesne assignments, to Automatic Electric Laboratories, Inc., Chicago, Ill., a corporation of Delaware Application February 7, 1941, Serial No. 377,832
In Great Britain March 13, 1940

3 Claims. (Cl. 177—353)

The present invention is concerned with improvements in systems for the remote supervision and/or control of electric power transmission equipment or the like and has for its chief object the provision of improved and simplified arrangements suitable for supervising and controlling a number of substations arranged in tandem such as may obtain with railway electrification schemes.

In systems of this kind it is generally thought essential that there should be some definite check on the correctness of the selecting operation before the executive operation is carried out, and in some systems the latter has been dependent on a specific action on the part of the operator, for instance, the pressing of a common "open" or "close" button. This arrangement, however, introduces the possibility of a delay of indefinite duration during which the equipment remains set up and the line held.

In the case of tandem operation the sending of signals to one station necessarily means that the other stations are locked out, but it is also important that each station should at all times be able to communicate with the control station without any appreciable delay so as to be able to send in a signal for instance indicating the automatic opening of a circuit breaker thereat. In previous systems this requirement could only be met by the provision of special priority "knockdown" equipment which would take over the line in case of urgent signals to be sent. But such equipment adds undesirable complications and also sensibly increases the expense. The chief object of the present invention, therefore, is to provide a simpler and cheaper solution without any appreciable sacrifice in the way of facilities provided.

According to the invention, in a remote control and supervisory system for the control of circuit breakers or like devices at any one of a plurality of substations connected in tandem to a control station, in which during the operation of effecting a change in the position or condition of one of the devices in a substation from the control station the possibility of any substation communicating with the control station is temporarily withdrawn, the said operation (which involves selecting the required device, checking the selection, effecting the desired change and signalling back that the change has been effected) is arranged to take place automatically in response to a suitable initiating operation so that the possibility of any substation communicating with the control station is restored after a predetermined short interval.

The invention will be better understood from the following description of one method of carrying it into effect, reference being had to the accompanying drawings comprising Figs. 1 to 5, of which Figs. 1 and 2 show the circuits of apparatus at the control room while Figs. 3 and 4 show the apparatus at a substation which, in common with the number of like substations, is connected to a two-conductor signal line extending from the control room. The four sheets of drawings should be arranged as shown in Fig. 5.

Referring now more in detail to the drawings, the control station shown in Figs. 1 and 2 is connected to substation 1 shown in Figs. 3 and 4, by a two-conductor line 18/19, while substation 1 in turn is connected to substation 2 (not shown) by a two-conductor line 20/21. It will be appreciated that substation 2 as well as each of the remaining substations is like that shown in Figs. 3 and 4, having a pair of incoming conductors corresponding to 18/19 and a pair of outgoing conductors corresponding to 20/21. Thus the substations are connected in series, and, at the one farthest from the control station, the conductors corresponding to 20/21 are connected together to complete a loop control circuit extending through all substations. For purposes of description, it will be assumed that there are nine substations, each having 39 circuit breakers to be controlled.

Above the horizontal dotted line in Fig. 1 is shown certain control equipment which is individual to substation 1; it will be appreciated that there is similar control equipment (not shown) individual to each of the remaining eight substations concerned, and that the apparatus shown in the balance of Figs. 1 and 2 is common to these nine units of individual control equipment. All nine units connect in identical fashion to the common leads 8—17, inclusive, while each unit has three additional conductors such as 5, 6 and 7, leading to switch banks SC2, SD2 and SD4.

The individual control equipment for each substation includes a keyset comprising 39 circuit breaker selection keys IBSK—39BSK, inclusive, and a pair of lamps COL and CCL for each key. Associated with each set of selection keys is a "selection correct" lamp SCL, a "close" key such as CKI, and an "open" key such as OKI. Further, each keyset has a relay such as ISK for controlling the operation of switches SC and SD. Attention is directed to the fact that when relay ISK is deenergized it connects positive potential over resting armature 1sk3 and conductor 7 to contact 10 in the contact bank associated with wiper SC2. In like manner the corresponding relay in the control equipment individual to substation 2 connects positive potential to contact 9 in the same contact bank, while that for substation 3 connects positive potential to contact 8, and so on, the relay for the last substation (i. e., substation 9) connecting positive potential to contact 2. Thus these nine relays in their normal condition maintain positive potential connected to contacts 2–10, inclusive, of the bank associated with wiper SC2; the reason for this will be made clear presently.

Assuming now that it is desired to close circuit breaker 1 at substation 1, the circuit breaker selection key 1BSK will be operated. This, at contact 1BSK—1 connects positive to contact 2 of the bank associated with wiper M3, and at contact 1BSK—3, connects positive over the common conductor 9 to contact 40 in the bank associated with wiper S4. The closing of contact 1BSK—2 completes an obvious circuit for energizing relay 1SK. Relay 1SK accordingly operates armature 1sk3, thereby disconnecting positive from contact 10 in the bank associated with wiper SC2, and connecting positive over conductor 6 to contact 2 in the bank associated with wiper SD2. At contact 1sk2, a circuit is prepared for the "selection correct" lamp SCL, and the closing of contact 1sk1 completes a circuit over common lead 11 to energize relay KA. Relay KA operates, and at contact ka1, prepares a locking circuit for relays K, CRO, and OPE; at contact ka2, it prepares an energizing circuit for relay BP.

No further operation will take place until the control room attendant momentarily operates either the "close" key CK1 or the "open" key OK1. Since in the present case it is desired to close a breaker, the former key will be operated. This establishes an obvious circuit over common conductor 15 and contact bu1 for energizing the upper winding of relay CRO. Relay CRO operates, and closes a locking circuit over its lower winding, contacts cro1 and ka1, thereby to remain operated independently of key CK1. At contact cro2, circuits are completed for energizing relays KR and PT, the circuit for relay KR extending from positive at contact cro2 over contact k1 and the winding of relay KR to negative, while the circuit for relay PT extends from positive at contact cro2 over wiper SC2 in position 1, wiper OP2 in position 1, and the winding of relay PT to negative.

Relay PT operates, and at armature pt1 prepares a circuit for connecting positive to conductor 18; at armature pt2, it prepares a circuit for connecting negative through resistor YB to conductor 19, while at armature pt3, it prepares a circuit for magnet SCM of the switch SC. Relay KR, upon operating, completes a circuit at contact kr1 for the winding of relay KRM. At contact kr2 it closes a circuit for the winding of slow-to-release relay SR, and at contact kr3 it establishes the following circuit for relay E: positive, contact kr3, contact bp1, winding of relay E, the upper winding of relay K, and negative.

Upon energizing, relay KRM operates armature krm1, to prepare a further point in the before-mentioned circuit for connecting positive to conductor 18, while at contact krm2, it completes the circuit prepared over armature pt2 for connecting negative through resistor YB to conductor 19. Relay SR operates, closing an obvious circuit for energizing its slow-to-release relief relay SRR, which in turn prepares a circuit for relay SH at contact srr1, and, at contact srr2, completes a circuit for the winding of relay BU. Relay BU, upon operating, opens contacts bu1 and bu2, thereby to guard against the possibility of any further operation of relays CRO and OPE in the event that a "close" key or "open" key in the control equipment individual to any substation should be operated. At contact bu3 the homing circuits for switches S, SD, SC, and M are opened.

Returning now to the circuit completed over the winding of relay E and the upper winding of relay K upon the operation of relay KR: Relay K is unable to operate in series with relay E, but relay E comes up, thereby completing the following circuit at contact e3: positive, operated armature pt1, contact e3, operated armature krm1, conductor 18, relay N, resting armature sen1, conductor 20, the loop which extends through the remaining tandem-connected substations, conductor 21, resting armature sen2, relay R, conductor 19, contact krm2, operated armature pt2, resistor YB, and negative. At the same time relay E completes the above circuit, it also energizes magnet SCM of the reverse drive switch SC over the following circuit: positive, contact e1, operated armature pt3, resting armature pta1, magnet SCM, and negative. Still further, relay E completes a circuit for the winding of its interrupter relay BP over contacts e2 and ka2. The latter relay operates, and at contact bp1 interrupts the above-traced energizing circuit for relay E, whereupon relay E releases, and at contact e2 opens the circuit for relay BP. Accordingly relay BP releases, closing contact bp1 and hence causing relay E to reoperate over its original energizing circuit. Relays E and BP continue to interact in the manner indicated, causing armature e1 periodically to interrupt the flow of current to the magnet SCM, while contact e3 periodically interrupts the flow of current over the loop circuit extending through the substations. These interruptions occur at a frequency of approximately ten per second.

Reviewing the effect of the operation of the selection key 1BSK and the "close" push key CK1, relays 1SK, KA, CRO, KR, PT, KRM, SR, SRR, BU, E and BP operate in rapid succession, the effect of which is to initiate the sending out to all the substations on the lines 18 and 19 a train comprising 50 impulses. This impulse train is made up of two portions, the first portion of ten impulses comprising the station code and serving to select the station to which the subsequent impulses are to be directed, while the second portion of 40 impulses serves to select the piece of apparatus, in this case a circuit breaker, at the given substation.

Upon each interruption of its circuit by contact e1, the magnet SCM restores, thereby advancing the wipers of switch SC one step. It will be remembered that although the operation of relay 1SK has disconnected positive potential from contact 10 in the bank associated with wiper SC2, such potential still is connected to contacts 2 to 9, inclusive, by the corresponding relays in the eight remaining units of individual control equipment; therefore, during the first nine steps of switch SC, relay PT will remain energized via a circuit which extends over the winding of relay PT, wiper OP2 in position 1, and wiper SC2 in positions 2 to 9. After the ninth step of switch SC, however, relay PT releases due to the absence of positive potential upon contact 10 of the bank associated with wiper SC2, and accordingly armatures pt1, pt2 and pt3 return to normal. Armature pt3 interrupts the circuit for magnet SCM bringing switch SC to a halt, and at the same time it prepares a circuit for magnet SDM.

Contact e3 has now interrupted the flow of current over the substation signalling circuit nine times, and upon the next energization of relay E it causes the current to flow over that circuit in the reverse direction due to armatures pt1 and pt2 having been restored to normal during the ninth interruption. Also, upon the next energization of relay E, contact e1 completes the following circuit for energizing magnet SDM of the reverse drive switch SD: positive, contact e1, resting armature pt3, resting armature pta2, magnet SDM and negative.

Relay E continues to interact with relay BP, and, upon each subsequent deenergization, opens contact e3 to interrupt the current flowing in the reverse direction over conductors 18 and 19; simultaneously with the first such interruption, contact e1 interrupts the circuit for magnet SDM, causing the wipers of switch SD to advance one step. Accordingly the following circuit is completed: positive, operated armature 1sk3, wiper SD2 in position 2, winding of relay PTA and negative. Relay PTA operates armature pta2, opening the circuit for magnet SDM to bring switch SD to a halt and preparing a circuit for magnet SM. At contact pta1 a circuit is prepared for magnet MM.

It will be appreciated that had the circuit breaker selection key corresponding to any circuit breaker in substation 2 been operated, positive potential would not have been connected to the second contact in bank associated with wiper SD2 by relay 1SK as in the present case; instead, in the individual control equipment for substation 2, the relay corresponding to relay 1SK would have been operated, connecting positive potential to contact 3 in the bank associated with wiper SD2, so that relay PTA would have operated to halt switch SD only after the latter switch had taken two steps. In all cases, the number of steps taken by switch SD is the same as the number of the substation having the circuit breaker which is desired to be controlled.

Relay E has now produced one interruption of the current flowing in the reverse direction over the substation signalling circuit. Upon the next energization of relay E, a circuit is completed for magnet SM of the reverse drive switch S: positive, contact e1, resting armature pt3, operated armature pta2, magnet SM, and negative. This circuit thereafter is interrupted by contact e1 in unison with the subsequent interruptions of the reverse current flow in the substation signalling circuit under control of contact e3, causing the magnet SM to step switch S in unison with such interruptions.

When wiper S4 reaches contact 40, the following circuit is completed: positive, contact 1BSK—3, common lead 9, wiper S4 in position 40, wiper OP2 in position 1, winding of relay PT and negative. Responsive to its energization over this circuit, relay PT operates armatures pt1, pt2, and pt3. The operation of armatures pt1 and pt2 is effective, upon the next energization of relay E, to cause current to flow over the substation signalling circuit in the same direction as originally, and, at the same time, magnet MM of the reverse drive switch M is energized over the following circuit: positive, contact e1, operated armature pt3, operated armature pta1, wiper SC3 in position 10, wiper SD3 in position 2, wiper SD4 in position 2, conductor 5, magnet MM, and negative.

The next deenergization of relay E causes contact e3 to interrupt the current flowing over conductors 18/19 and causes contact e1 to interrupt the above traced circuit for magnet MM. Accordingly, the wipers of switch M advance one step, whereupon the following circuit is completed: positive, contact 1BSK—1, wiper M3 in position 2, common conductor 17, upper winding of relay K, and negative. Relay K operates, and closes a locking circuit for itself over its lower winding, and contacts k2 and ka1. At contact k1, it interrupts the circuit for relay KR which restores and at contact kr3 opens a further point in the circuit for relay E, thereby to prevent the latter relay from reenergizing under control of its interrupter relay BP. The release of relay KR also opens the circuit for relay KRM at contact kr1 and that for relay SR at contact kr2. Relay KRM restores, and at armature krm1 reconnects relays O and I into the substation signalling circuit in readiness to receive the "check" signal from substation 1. After a delay due to its slug, relay SR also releases, and opens the circuit for relay SRR; the latter relay remains operated for a further interval due to its slug, and hence before it has an opportunity to restore to normal, the "check" signal will ordinarily have been transmitted from the substation, as will now be described.

It will be remembered that under control of switch SC, there have been nine interruptions of current flowing in the original direction in the substation signalling circuit, followed by one interruption of reverse current under control of switch SD, then by 39 additional interruptions of reverse current under control of switch S and finally by one interruption of normal current under control of switch M. Considering the effect of these operations upon the equipment at the various substations, attention is directed to the fact that each substation has a magnetically polarized relay such as N, which operates only when energized by current flowing over the signalling circuit in the normal direction, and a further magnetically polarized relay such as R, which operates only when energized by current flowing over the signalling circuit in the reverse direction. Accordingly the relays N operate initially and respond to the first nine interruptions.

Considering the operations at substation 1, relay N upon energizing closes contact n1, thereby energizing the upper winding of relay S; it also completes the following circuit for relay HRR: positive, contact n1, wiper A3 in position 1, the lower winding of relay HRR and negative. Relay HRR operates armature hrr2 thereby to open the homing circuit for switches A, B and C, and at contact hrr1 it energizes magnet AM of the reverse drive switch A. The circuit for magnet AM is as follows: positive, contact n1, wiper A3 in position 1, contacts hrr1 and co2, magnet AM, and negative. Relay S, when energized over its upper winding upon the closing of contact n1, operates armature s1 to complete an obvious circuit for slow-to-release relay PI. The latter relay prepares a circuit for relays H and HD at contact pi1, while at contact pi2 it energizes the slow-to-release relay HR; relay HR operates, and at contact hr1 completes a holding circuit for relay HRR.

Relay N now releases 9 times. Relay S, however, being slow-to-release, remains operated between successive restorations of contact n1, and accordingly maintains relays PI, HR and HRR operated. Upon each opening of contact n1, the above-traced circuit for magnet AM is interrupted, causing the wipers of switch A to advance one step. At the end of the first interruption, the circuit for magnet AM is recompleted over wiper A3 in position 2. Similarly, after the second interruption, the magnet circuit will be reestablished over wiper A3 in position 3; then, after third interruption over wiper A3 in position 4, and so on until, following the ninth interruption, wiper A3 rests upon contact 10.

If relay N were to reoperate following the ninth interruption of the substation signalling circuit, a circuit would be completed from positive over contact n1, wiper A3 in position 10, the jumper (shown dotted), lower winding of relay CO to negative. Relay N does not operate after the ninth interruption, however, due to the next current flow over the signalling circuit being in the reverse direction, and hence relay CO is not operated over the above-mentioned circuit. Instead, relay R comes up, operating contact r1. This contact completes an obvious circuit for maintaining relay S operated, and also establishes the following circuit for reenergizing magnet AM: positive, contact r1, wiper A2 in position 10, the jumper (shown dotted), contacts hrr1 and co2, magnet AM, and negative. The latter circuit is opened by contact r1 upon the first interruption of the reverse current flow in the substation signalling circuit, and accordingly the wipers of switch A are advanced to position 11.

It will be self-evident that the strapping and cross connections between the contact banks associated with wipers A2 and A3 are such that switch A will reach position 11 only if the station selecting code comprises nine interruptions of current flowing in the normal direction followed by one interruption of reverse current. Had the current in the signalling circuit been reversed after only eight interruptions, for example, contact r1 upon closing would have completed a circuit over wiper A2 in position 9 for energizing the lower winding of relay CO. Relay CO, upon operating, would then lock over its upper winding and contacts co1 and hr1, while at contact co2 it would open the circuit for magnet AM, thereby preventing switch A from following the remaining interruptions of the current flowing in the signalling circuit.

Each substation has a different code, the strapping and cross connection between the banks associated with wipers A2 and A3 in each case corresponding to the code for the station in question; thus whenever any substation code is transmitted, the switch A at the substation having that code will reach position 11 while the corresponding switches at all other substations will fail to reach position 11, due to the operation of relay CO either over wiper A2 or over wiper A3, as described.

Returning to the operations at substation 1: When the reverse current flow in the signalling circuit is resumed after the first interruption, the following circuit is completed for magnet BM of the reverse drive switch B: positive, contact r1, wiper A2 in position 11, magnet BM and negative. Thirty-nine additional interruptions of the reverse current flow in the signalling circuit now occur in succession, and, upon each of these, relay R opens the circuit for magnet BM at contact r1, causing the wipers of switch B to advance one step; accordingly after the last interruption, the wipers stand in position 40.

It will be remembered that the current which flows in the signalling circuit after this last interruption is in the same direction as the original current, so that relay N again energizes. Contact n1 maintains relay S operated over its upper winding as before, and completes the following circuit for magnet CM of the reverse drive switch C: positive, contact n1, wiper A3 in position 11, magnet CM, and negative. The latter circuit is opened by contact n1 when now the current in the signalling circuit is interrupted for the final time, and therefore switch C advances to position 2. The prolonged opening of contact n1 also causes the slow-to-release relay S to restore after an interval, whereupon the following circuit is established: positive, resting armature s1, contacts pi1, wiper B4 in position 40, wiper C1 in position 2, the winding of relay H (and, in parallel therewith, the lower winding of relay HD) and negative.

Relay HD operates and immediately locks up over its upper winding and contacts hd1 and hrr3. At contact hd3 a circuit is prepared for the circuit breaker operating solenoids 1CIR—39CIR and 1OIR—39OIR; at contact hd2 a circuit is prepared for sending out the "check" signals, and at contact hd4, an obvious circuit is completed for energizing relay SEN. The latter relay operates armatures sen1 and sen2, disconnecting the subsequent substations from the common signalling circuit, and further preparing for the sending of the "check" signal.

Relay H operates, and at contact h1 establishes the following circuit for magnet AM of the reverse drive switch A: positive, operated armature hrr2, wiper A4 in position 11, contact h1, magnet AM and negative. Contact h2 also closes, operating relay REC. The latter relay closes contacts rec1 and rec2 to short-circuit the windings of relays N and R, respectively. At armatures rec3 and rec4, the following circuit is completed for initiating the transmission of the "check" signal: positive, contact hd2, resting armature sen2, contact rec2, conductor 19, the windings of relays O and I in series, resting armature krm1, conductor 18, contact rec1, operated armature sen1, contact rec4, resting armature rv2, resistor YC, and negative. It will be noted that the polarity of the "check" signal (i. e., the direction in which current flows over the signalling circuit) depends upon whether relay RV is operated or at normal. The winding of this relay in the present instance is connected over wiper C2 in position 2 to contact 1CBC; due to circuit breaker 1 being open, contact 1CBC is also open, and hence relay RV remains at normal.

The above-mentioned restoration of armature s1 to normal also opens the circuit for the slow-to-release relay PI which restores after an interval. Thereupon it opens the circuit for slow-to-release relay HR at contact pi2, and at contact pi1 it opens the above traced circuit for relays H and HD. The latter relay remains operated over its upper winding, but relay H releases, opening the circuit for magnet AM at contact h1, and hence causing the wipers of switch A to advance to position 12. Contact h2 opens the circuit for relay REC which releases, thereby restoring armatures rec3 and rec4 to terminate the "check" signal, while contacts rec1 and rec2 remove the short-circuits from relays N and R.

Returning now to the control station, it will be remembered that when the apparatus thereat finished generating circuit breaker selection code, relay KR released, interrupting the circuit for slow-to-release relay SR by opening contact kr2. Then, after a delay due to its slug, relay SR restored, opening the circuit for relay SRR. The latter relay is also provided with a slug, and hence, before it can restore, the "check" signal is transmitted from substation 1 as has been described, indicating that a correct selection has been effected; this signal is received by the oppositely polarized relays O and I, the current flow through their windings in the present case being in such a direction as to operate only relay O. Thereupon a circuit is completed over contacts o1 and srr1 for energizing relay SH, while at contact o2 the following circuit is also established: positive, contact o2, common conductor 13, wiper M1 in position 2, windings of the polarized latching relay ICON, wiper M2 in position 2, common conductor 14, resistance YF, and negative. Relay ICON does not change the position of its armature icon1 when energized over this circuit, and hence the "circuit breaker open" lamp COL remains lighted.

Relay SH, upon operating, completes an obvious circuit for relay SR at contact sh1, and the latter relay thereupon closes contact sr1 to prevent relay SRR from releasing. At contact sh2 a circuit is etablished over common conductor 12 and contact 1sk2 for lighting the "selection correct" lamp SCL, while armature sh3 completes a circuit over its front contact, wiper OP1 in position 1, and interrupter contact opm for energizing magnet OPM of the reverse drive switch OP. The magnet operates and by opening contact opm interrupts its own circuit, whereupon the wipers of switch OP are advanced one step. This opens the circuit for relay PT which extended over wiper OP2 in position 1, and the relay therefore releases.

Upon termination of the "check" signal, relay O restores, opening the circuit for the winding of relay SH at contact o1. Relay SH accordingly restores, opening the circuit for slow-to-release relay SR at contact sh1 and opening the circuit for the "selection correct" lamp at contact sh2. The restoration of armature sh3 to normal completes a circuit over its associated front contact, wiper OP1 in position 2, and interrupter contact opm, for again energizing magnet OPM. Upon operation, the magnet interrupts its circuit by opening contact opm, and hence advances the wipers of switch OP to contact 3. Thereupon a circuit is completed over wipers OP1 and OP4 for operating magnet OPM self-interruptedly until the wipers of switch OP reach position 49. When wiper OP3 reaches contact 3 an obvious circuit is established for energizing the winding of relay OPB.

Relay OPB operates, and by closing contact opb1 maintains relay SR operated. At contact opb2 a circuit is completed for the winding of relay KRM, and at contact opb3 a circuit is prepared for sending the "operate" signal to the substation. Relay KRM operates, thereby establishing the following circuit to initiate transmission of this signal: negative, resistance YB, resting armature pt1, contact opb3, operated armature krm1, conductor 18, relay N at substation 1, operated armature sen1, resting armature rec3, operated armature sen2, relay R, conductor 19, contact krm2, resting armature pt2, and positive. It will be noted that the "operate" signal in this instance constitutes current flowing over the substation signalling circuit in what has been referred to as the "reverse" direction, so that relay R, but not relay N, will operate in response thereto.

When wiper OP3 reaches contact 25, the circuit for relay OPB is opened. This relay restores and ends the transmission of the "operate" signal by opening contact opb3; it also opens the circuits for relays KRM and SR at contacts opb2 and opb1, respectively. Relay SR remains operated for an interval due to its slug, but relay KRM restores at once, reconnecting relays O and I to the substation signalling circuit by returning armature krm1 to normal.

Considering now the effect of the "operate" signal upon the equipment at substation 1, relay R will operate in response thereto, as previously mentioned. The closing of contact r1 energizes the lower winding of relay S, and the latter relay in turn closes contact s1 to operate relay PI. It will be remembered that relay HR has remained operated due to its slug since the opening of contact pi2 a short interval earlier, and hence the present reoperation of relay PI prevents relay HR from restoring. Under control of relay HR, relays HRR, HD and SEN have also remained energized.

The closing of contact r1 completes the following circuit: positive, contact r1, wiper A2 in position 12, wiper B6 in position 40, solenoid 1CIR, contact hd3 and negative. Solenoid 1CIR upon energization closes circuit breaker 1, and at the same time establishes a circuit over contact 1CBC, wiper C2 in position 2, and the winding of relay RV. Relay RV operates. When relay R now restores at the end of the "operate" signal, it opens the circuit for solenoid 1CIR at contact r1, but it will be appreciated that the circuit breaker nevertheless remains in its new position. The restoration of contact r1 to normal also causes relay S to release, whereupon armature s1 completes a previously traced circuit for energizing the winding of relay H. Relay H operates and, by closing contact h2, operates relay REC. The latter relay thereupon initiates transmission of the "check back" signal by completing the following circuit: positive, contact hd2, operated armature rv2, contact rec4, operated armature sen1, contact rec1, conductor 18, resting armature krm1, relays I and O, conductor 19, contact rec2, operated armature sen2, operated armature rec3, operated armature rv1, resistance YC and negative.

It will be noted that the "check back" signal is identical to the "check" signal previously transmitted from substation 1, except that it is of opposite polarity, i. e., due to relay RV now being operated the current flows over the signalling circuit in a direction opposite to that in which it flowed in the case of the "check" signal.

The restoration of armature s1 to normal opens the circuit for relay PI, which releases after an interval due to its slug. By opening contact pi1, this causes relays H and REC to restore in the order named, as previously described, and hence terminates transmission of the "check back" signal in the same way that the "check" signal was terminated. The release of relay PI also opens the circuit for slow-to-release relay HR at contact pi2, so that after an interval relay HR restores. This in turn opens contact hr1, causing relay HRR to release. Relay HRR interrupts the holding circuit for relay HD at contact hrr3, whereupon the latter relay also releases, opening contact hd4 to cause relay SEN to release.

Upon the restoration of relay HRR to normal, a homing circuit for switch A is completed: positive, resting armature hrr2, wiper A1 in position 12, interrupter contact am, magnet AM, and negative. Magnet AM operates self-interruptedly in this circuit, advancing switch A step by step until wiper A1 reaches contact 1. There the circuit for magnet AM is interrupted, bringing switch A to a halt; at the same time the following circuit is established: positive, resting armature hrr2, wiper A1 in position 1, the operated off normal contact CONS of switch C, interrupter contact cm, magnet CM, and negative. Magnet CM operates self-interruptedly in this circuit, advancing the wipers of switch C step by step until they reach normal. When this occurs the off normal contact CONS is restored, opening the circuit to magnet CM and thereby bringing switch C to a halt. Restoration of contact CONS also establishes a homing circuit for switch B: positive, resting armature hrr2, wiper A1 in position 1, off normal contact CONS, the operated off normal contact BONS of switch B, interrupter contact bm, magnet BM, to negative. Magnet BM now operates self-interruptedly in this circuit, advancing the wipers of switch B step by step to their home position. When they reach home, off normal contact BONS restores, opening the circuit for magnet BM and hence halting switch B. All of the relays and switches at the substation have now been returned to normal.

Considering the effect of the "check back" signal upon the equipment at the control station, it will be clear that this operates relay I but does not operate relay O. Contact i1 completes a circuit over contact srr1 for reenergizing relay SH. Relay SH operates contact sh1 thereby again establishing a circuit for relay SR. Contact sh2 lights the "selection correct" lamp SCL once more, while armature sh3 disconnects positive potential from contacts 49 and 50 of the bank associated with wiper OP4, it being understood that this occurs before wiper OP4 reaches contact 49.

The operation of relay I also completes the following circuit: positive, contact i2, common conductor 14, wiper M2 in position 2, the windings of the polarized latching relay 1CON, wiper M1 in position 2, common conductor 13, resistance YE, and negative. When thus energized, relay 1CON reverses its armature 1con1, thereby extinguishing the "circuit breaker open" lamp COL and lighting the "circuit breaker closed" lamp CCL. When relay I restores at the end of the "check back" signal, the circuit for relay 1CON is opened at contact i2, but it will be understood that the relay nevertheless maintains its armature 1con1 in its new position. Contact i1 opens the circuit for relay SH, which restores. At contact sh1, the circuit for slow-to-release relay SR is opened, while at contact sh2, the "selection correct" lamp SCL is extinguished. The restoration of armature sh3 to normal reconnects positive potential to contacts 49 and 50 of the bank associated with wiper OP4; if this does not occur before the wiper reaches contact 49, the self-interrupted operation of switch OP will be halted until it does occur, and then will be resumed until switch OP reaches its normal position.

It will be appreciated that wipers OP2 and OP3 have to make a complete revolution, i. e., fifty steps, before again reaching normal position. As no circuits are completed in positions 26—50, however, there is no need to provide additional wipers at 180° as must be done with wipers OP1 and OP4.

The circuit for slow-to-release relay SR having been opened at contact sh1, this restores after an interval and opens the circuit for relay SRR at contact sr1, causing the latter relay to release after a further interval. The opening of contact srr2 then causes relay BU also to release, whereupon the following circuit is established: positive, contact bu3, wiper S3 in position 40, interrupter contact sm, magnet SM, and negative. The magnet operates self-interruptedly in this circuit, advancing switch S step by step until the wiper S1 reaches contact 1. There the switch halts, and a homing circuit for switch SD is completed: positive, contact bu3, wiper S1 in position 1, wiper SD1 in position 2, interrupter contact sdm, magnet SDM and negative. Magnet SDM operates self-interruptedly in this circuit until wiper SD1 reaches normal, and then stops. The following homing circuit for switch SC has now been established: positive, contact bu3, wiper S1 in position 1, wiper SD1 in position 1, wiper SC1 in position 10, interrupter contact scm, magnet SCM and negative. Magnet SDM operates self-interruptedly in this circuit until wiper SC1 reaches normal, whereupon the switch halts and completes the following circuit: positive, contact bu3, wiper S1 in position 1, wiper SD1 in position 1, wiper SC1 in position 1, common conductor 10, operated off normal contact MONS1, interrupter contact mm1, magnet MM, and negative. Magnet MM operates self-interruptedly in this circuit until switch M reaches normal; when this occurs the circuit is opened by operation of off-normal contact MONS1 to bring the switch to a halt.

The circuit breaker selection key 1BSK now will be returned to normal by the control room attendant, causing relay 1SK to release, which, by opening contact 1sk1, will also release relay KA. Accordingly contact ka1 opens, causing relays K and CRO to restore. All of the equipment at the control station now is at normal.

Should it be desired to open a circuit breaker at a substation, the appropriate selection key and the "open" key OK will be actuated and the ensuing operations up to the extension of the "operate" pulse to the substation will be the same as already described except for the fact that relay OPE will be operated instead of relay CRO. Hence when switch OP is set in operation at the control room on the receipt of the check pulse, relay PT will be operated over contact ope3 and wiper OP2 and will initiate the sending of a normal pulse to the substation so that relay N will be operated. Relay N in operating contact n1 will apply positive over wiper A3 in position 12 and wiper B5 in position 40 (assuming that circuit breaker No. 1 is being controlled) to operate the "open" solenoid 10IR associated with this particular circuit breaker, which will thereupon be changed over ot the "open" position. The subsequent "check back" operation of this changeover follows on the lines already described except that with relay RV normal, relay O is operated at the control room and changes over the indicator relay 1CON to the "open" position shown whereupon the "open" lamp COL is lit.

The operations in response to the actuation of other selection keys will be readily appreciated from examination of the drawings.

Further operations such as those obtaining when a circuit breaker at a substation changes position automatically due to local conditions thereat and telephone communication to and from substations may be effected along lines well-known to those versed in the remote supervisroy control art, and further information in regard thereto may be obtained from a study of Br. Patent No. 375,325, issued to Percy F. Gunning et al., which discloses an earlier form of system operating on the same fundamental principles as the one described herein but not suitable for the tandem operation of substations.

We claim:

1. In a remote control system, a control station, a substation connected to said control station by a signalling circuit, a plurality of devices at said substation, means at said control station for transmitting over said circuit to said substation a train of impulses of one polarity and a train of impulses of another polarity, polarized means at said substation for registering the impulses of said one polarity, other polarized means at said substation for registering the impulses of said other polarity, means controlled by one of said trains of impulses for selecting one of said devices in accordance with the number of impulses in that train, means at the substation operated after both of said trains have been received for determining if the total number of impulses received in said two trains is a predetermined number and, if it is, for initiating the transmission of a check back signal to said control station, means for terminating the transmission of said signal after an interval, means at said control station operated responsive to the termination of said signal for initiating the transmission of an operate signal to said substation, and means at said substation for operating the selected device responsive to the receipt of said operate signal.

2. In a remote control system, a control station, a plurality of substations connected in tandem to said control station by a common signalling circuit, a plurality of devices at each of said substations, a transmitter at said control station for transmitting over said common circuit four impulse trains each comprising a variable number of impulses, said transmitter including means whereby the sum of the impulses in the first train and the second train equals a predetermined number and the sum of the impulses in the third train and the fourth train equals a predetermined number, said transmitter also including means whereby the polarity of the impulses in said first train is different from that of the impulses in said second train and the polarity of the impulses in said third train is different from that of the impulses in said fourth train, means controlled conjointly by said first and second impulse trains for selecting one of said substations in accordance with the number of impulses in said first train, and means controlled conjointly by said third and fourth impulse trains for selecting one of said devices in the selected substation in accordance with the number of impulses in said third train and for automatically operating the selected device.

3. In a remote control system, a control station, a plurality of substations connected in tandem to said control station by a common signalling circuit, a plurality of devices at each of said substations, means at said control station for transmitting over said common circuit a first impulse train comprising a variable number of impulses, a second impulse train comprising a number of impulses complementary to the number of impulses in said first train, a third impulse train comprising a variable number of impulses, and a fourth impulse train comprising a number of impulses complementary to the number of impulses in said third train, whereby the sum of the impulses in said first and second trains equals a predetermined number and the sum of the impulses in said third and fourth trains equals a predetermined number, two relays at each of said substations, one of said relays responsive to the impulses of said first train but not to the impulses of said second train, the other of said relays responsive to the impulses of said second train but not to the impulses of said first train, an automatic switch at each substation operated step-by-step under control of said relays at that substation in accordance with the impulses in said first and second trains of impulses, two contact banks on each of said switches, each said bank having an associated wiper, a contact on said one relay operated to apply potential to one of said wipers whenever said one relay responds to an impulse of said first train, a contact on said other relay operated to apply potential to the other of said wipers whenever said other relay responds to an impulse of said second train, a relay at each of said substations connected to certain contacts in one bank of the switch at that substation and also connected to certain contacts in the other bank of the switch at that substation so that said last relay will be operated over one or the other of the wipers of said switch by the potential applied thereto unless said first train of impulses comprises a predetermined number of impulses, means at each substation effective only if said last relay at that substation is not operated during the receipt of said first or second impulse train, said last means controlled conjointly by said third and fourth impulse trains for selecting one of said devices at that substation in accordance with the number of impulses in said third train and for automatically operating the selected device.

GEORGE ARTHUR BURNS.
CHRISTOPHER RONALD IRGIN.